Oct. 29, 1935.  S. G. TILDEN  2,018,689
FRICTION TESTER
Filed Aug. 9, 1933   2 Sheets-Sheet 1

INVENTOR
Sydney G. Tilden
BY
his ATTORNEY

Oct. 29, 1935.　　　　S. G. TILDEN　　　　2,018,689
FRICTION TESTER
Filed Aug. 9, 1933　　　2 Sheets-Sheet 2

INVENTOR
Sydney G. Tilden
BY
his ATTORNEY

Patented Oct. 29, 1935

2,018,689

UNITED STATES PATENT OFFICE 2,018,689

FRICTION TESTER

Sydney G. Tilden, Stewart Manor, Long Island, N. Y., assignor to Raybestos-Manhattan, Inc., Passaic, N. J., a corporation of New Jersey Application August 9, 1933, Serial No. 684,419

9 Claims. (Cl. 265—10)

This invention relates to friction testers, and more particularly to the structure described in my co-pending application Serial No. 622,704, filed July 15, 1932, and this application is a continuation in part of that application.

The present invention includes a compact and efficient structure of the cam and the support therefore, of the testing tip, and of the measuring scale.

The invention will be more fully described hereinafter, and embodiments thereof shown in the drawings and the invention will be finally pointed out in the claims.

In the accompanying drawings.

Similar characters of reference indicate corresponding parts throughout the various views.

Figures 1, 2, 3, 4:
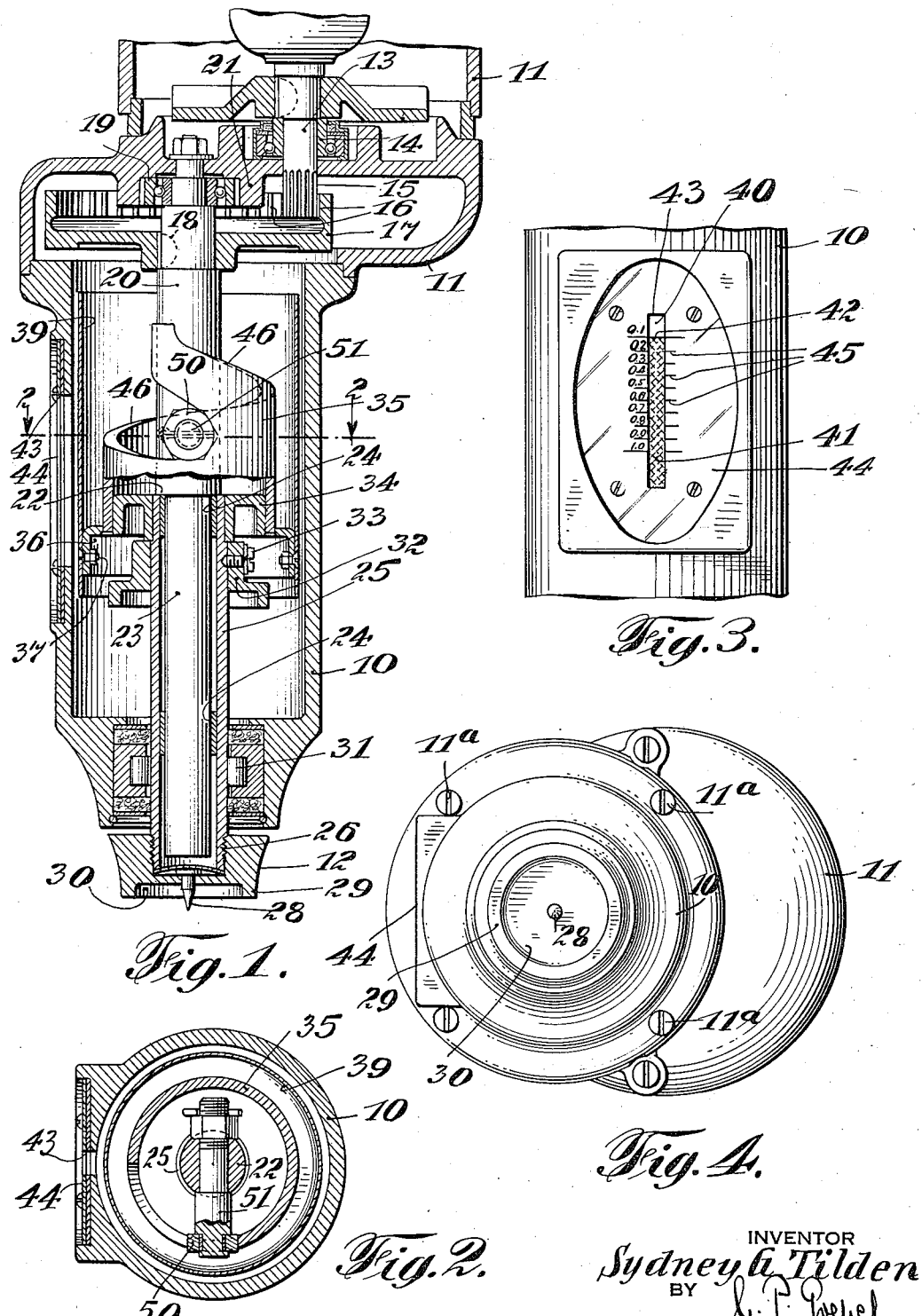
Figure 1 is a vertical central section of a device embodying my invention.
Figure 2 is a horizontal transverse section taken on the line 2—2 of Figure 1.
Figure 3 is an enlarged view of the indicator.
Figure 4 is a bottom view of the device shown in Figure 1.
Figure 5:
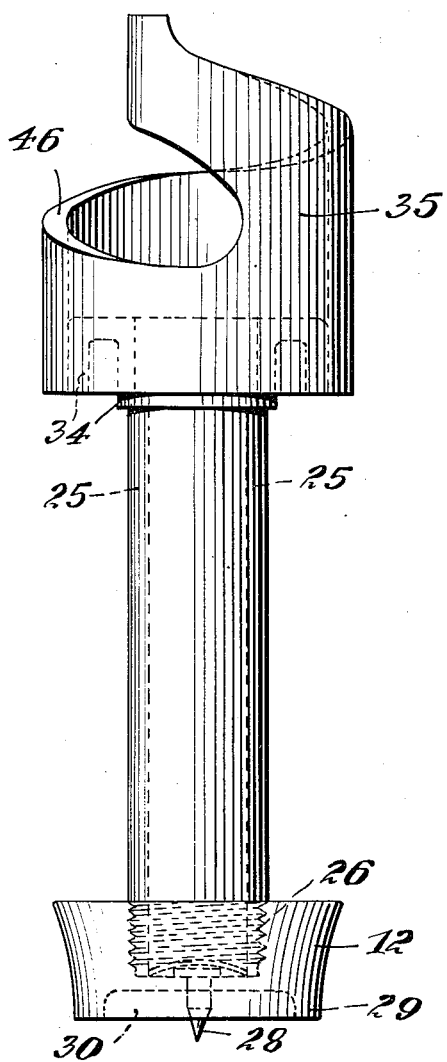
Figure 5 is a side view of the cam and its supporting shaft and of the testing tip.
Figure 6:
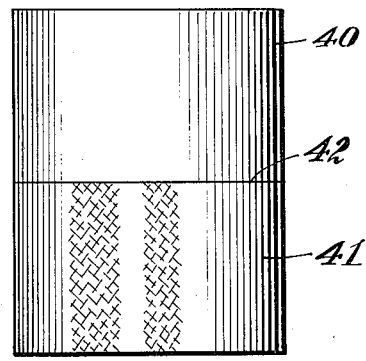
Figure 6 is an enlarged view of the sleeve which is movable with the cam, which sleeve is part of the means of indicating the coefficient of friction.

Referring to the figures, and more particularly to Figures 1, 2, and 3, the device there shown consists of a casing 10 having a supplementary casing 11 above the same, and a testing tip 12 below the same. The supplementary casing 11 has projecting therein a shaft 13 suitably supported and guided by a ball bearing 14 of any approved construction, and the end of the shaft 13 is provided with teeth 15 engaging the inwardly extending teeth 16 of a gear 17. This gear 17 is secured by a suitable key 18 to shaft 20, the shaft 20 being guided by a ball bearing 19 placed in a depending portion 21 of the supplementary casing 11. Thus, as the shaft 13 is rotated by any suitable means as an electric motor, or the like, the shaft 20 is likewise rotated. The shaft 20 extends downwardly and is provided with a shoulder 22 and extends further down with its sub-caliber portion 23 having its lowermost end free of the testing tip 12. Bushings or shaft bearings 24 are arranged inside of the sleeve 25 and the shaft 23 moves on the inner periphery of the bushings 24. The lowermost end of the sleeve 25 has secured thereto the testing tip 12, and in the preferable form shown in the drawings the lowermost portion of the sleeve 25 is exteriorly screw-threaded as shown by 26, which screw threads engage the interior screw threads of the testing tip 12. This testing tip is provided with a sharpened pin 28 centrally thereof. Circumferentially disposed around the pin 28 is a circular flange 29 forming a recess 30, through which center part, the pin 28 passes, after which it extends beyond the plane of the tip 12 to project therefrom. The sleeve 25 is guided by roller bearings 31 arranged in the lower part of the casing 10 and secured to the upper part of the sleeve 25 is an annular support or collar 34. Upon this collar 34 is fastened a cam portion 35. A tubular sleeve 39 is fastened to a collar 36 by bolts 37, and this sleeve extends upwardly from the collar beyond the opening 43 in any position of the sleeve. The exterior of the sleeve is divided by a line of demarcation 42, and the two halves are differently colored, one half 40 preferably white, and the other half 41 preferably black or red, or vice versa. The line of demarcation 42 is a circle normal to the axis of the shaft 23. The casing 10 is provided with an opening 43 forming a window covered by means of a transparent celluloid 44 through which the line of demarcation may be seen. This indicates the position of the tubular sleeve 39 which in turn shows the position of the roller 51 on cam 46. As the outer wall of the casing 10 is provided with a graduated scale such as indicated in Figure 3 by 45, and as the sleeve moves parallel to its axis, the line of demarcation 42 between the variously colored portions will be visible through the window 43 and its position registered on the scale 45 on the outside of the casing.

Figure 8:
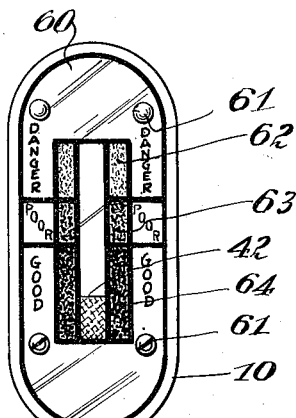
Figure 8 is a front view of another embodiment of the scale and similar to that of Figure 3.

Another form of scale is shown in Figure 8, in which line of demarcation 42 is seen, and the plate 60 which is attached by screws 61 to the casing 10, is provided with differently colored panels 62, 63 and 64, and for ready visibility, printed markings such as good, poor and danger, are shown. This method lends itself readily to quick reading.

The member 35 is provided with a cam surface 46, the shape of which is determined as desired by the requirements. In the embodiment shown in Figure 1, the cam surface 46 extends circumferentially around the member 35 so as to complete the circle. In other words, it requires a complete revolution of the member 35 to be able to take care of the entire travel of a driver thereon. Upon this cam surface 46, a driver 50 rides, which driver 50 is supported on a horizontal shaft 51, which horizontal shaft is secured to the vertical shaft 20. Suitable bearings or bushings may be provided on the horizontal shaft 51 to readily guide the driver 50, preferably in a substantially frictionless manner.

The action of the instrument when making a test of the coefficient of friction of any surface is to impart to the testing tip 12, rotation and axial force. Rotation is imparted by means of the gearing described to shaft 20, thence through shaft 51 to cam driving roll 50 which acts upon the cam surface 46, thence through sleeve 25 to testing tip 12. Axial force is transmitted from housing 11 which is held in the hands, through bearing 19 to shaft 20, thence through shaft 51 to cam driving roll 50, to cam surface 46 through sleeve 25 to testing tip 12.

From the above, it will be evident that the cam driving roll 50 and cam 46 are simultaneously acted upon by both an axial force and a rotative force, and the position of the cam driving roll 50 on cam 46 indicates the relation of the axial and rotative forces which depend upon the resistance offered to rotation and pressure by the surface to which the testing tip 12 is applied.

The centering pin 28 holds the testing tip 12 in position in respect to the material onto which it enters and confines all motion of the testing tip to rotation about the axis of the centering pin. Thereby an efficient and accurate device is produced for determining the co-efficient of friction between two materials.

The coefficient of friction between two materials is a ratio of force required to move one surface over another at uniform velocity, to the total force pressing both surfaces together. If the former be marked as F and the latter denoted as P, then we would have the coefficient of friction as equal to $$\frac{F}{P}.$$

Figure 7:
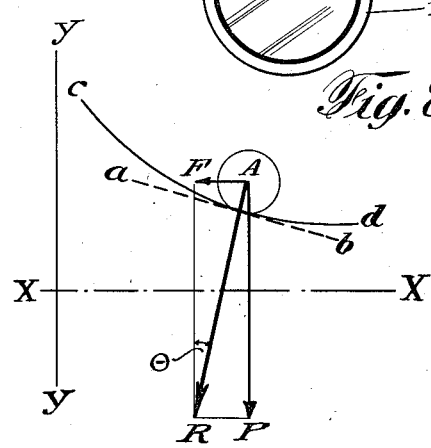
Figure 7 is a diagram of the cam driving roll and a portion of the cam showing the roller aligned so that the resultant (R) of the forces acts radially on the center of the roller with no components to cause the roller to move sidewise along the cam.

In the force diagram, Figure 7, the vertical and horizontal forces, P and F respectively, are shown together with the resultant (R) and the broken line (ab) at right angles or normal to the resultant (R). The cam contour (cd) is shown tangent to the line (ab) at the point of intersection of the resultant (R); and the cam follower (A) tangent to the cam contour (cd) and the line (ab), also at the point of intersection of the resultant (R). It will be seen that the resultant (R) has no components along the line (ab) or cam contour (cd) effective to cause the cam follower (A) to move along the line (ab) or the cam contour (cd). By selecting points on the Y axis corresponding to desired values of the coefficient of friction ($\mu$), the cam contour (cd) may be readily plotted for any ranges of co-efficient of friction ($\mu$) desired. This co-efficient of friction heretofore shown is considered equal to one when the force necessary for motion of uniform velocity (F) equals the force of application (P).

When shown as a force diagram, the ordinate along the Y axis represent the force of application (P), and the abscissa along the X axis represents the force necessary to maintain motion of uniform velocity (F). If a line were drawn diagonally connecting the abscissa and ordinates, a right angle triangle would be formed, the hypothenuse of which would represent in direction and intensity the resultant (R) of the two forces (P) and (F). It should be here noted that the coefficient of friction, $\mu$, for any two surfaces is independent of the relative velocity of the surfaces and since the intensity of the force necessary to maintain motion of uniform velocity (F) is always proportional to the force of application (P), it follows therefore that the direction of the resultant force (R), does not vary with the intensity of (F) and (P). It is therefore established that for each value of the coefficient of friction $\mu$ there is corresponding definite direction of the resultant (R), and the angle $\theta$ which the resultant (R) if prolonged, makes with the Y axis is the angle whose tangent is $$\frac{F}{P}$$

and inasmuch as $$\frac{F}{P}$$

is also equal to the coefficient of friction $\mu$, it follows therefore that the angle $\theta$ is the angle whose tangent is equal to the coefficient of friction $\mu$, as follows:—

$$\tan \theta = \frac{F}{P} = \mu$$

In past practice, it has been the custom to determine the coefficient of friction $\mu$ by measuring, individually, the force necessary to maintain motion of uniform velocity (F) and the force of application (P) non-variable during the test, and then divide the former, (F), by the latter (P), but in devices made in accordance with this invention, the coefficient of friction ($\mu$) is measured by directly ascertaining the direction of the resultant (R) of the variable two forces (F) and (P).

The invention embodies this principle in that in the device proposed to measure the coefficient of friction between two materials, one of these materials is integral with the device which is applied to the second material. Thus the force of application (P) is furnished by the operator pressing the device against the material to be tested, and the force necessary to maintain motion of uniform velocity is furnished by an external driving mechanism which furnishes motion of rotation rather than of translation.

The testing tip may be of any suitable material as iron, steel, rubber, wood, bakelite, etc. Any material may be tested, as the readings obtained are the coefficient of friction between the material of the testing tip and the material being tested. The material of the testing tip and the material being tested may be the same or different.

From the foregoing, it will be seen that the invention herein disclosed embodies improvements over the device shown in the former application, Serial No. 622,704, filed July 15, 1932, in that the tubular shaft is supported on the cam member and rotates therewith, and enables the readings to be taken in a very convenient and efficient manner through an opening or window in the casing 10. Furthermore, the tubular sleeve shaft 25 which extends from and rotates with the cam member 35 has secured thereto as its lowermost portion the testing tip 12 having the circular flange 29 and the central pin 28. In addition, the improved testing tip described has a centering pin 28 centrally of the circular flange 29, and this is shown and described in the earlier application and claimed therein. Finally, the embodiment herein described improves upon the earlier disclosure of said application by having the cam position revealed on a stationary scale.

It is obvious that various changes and modifications may be made in the details of construction of the above specifically described embodiment of this invention without departing from the spirit thereof, such changes and modifications being restricted only by the scope of the following claims.

I claim:

1. A friction tester comprising a casing having an opening in the side thereof, a sleeve within the casing adapted to move axially of the casing and to be visible through said opening to show the position of the sleeve in respect to the casing, a rotatable friction element, and means interposed between the friction element and said sleeve whereby resistance to movement of said friction element causes relative axial movement of the sleeve in respect to the casing.

2. A friction tester, comprising a casing, a shaft therein, means for rotating the shaft, a second shaft concentrically disposed with respect to the first shaft, a testing tip on said second shaft, a cam on the second shaft, and a roller pin on the first shaft, said second shaft extending outwardly of the casing and being secured to the testing tip at the exterior of the casing.

3. A friction tester comprising a casing, a casing supplementary to the first casing and having operative mechanism therein for rotating a shaft, a shaft in the first named casing rotated by said mechanism of the supplementary casing, a second shaft surrounding the first shaft and extending beyond the same and exterior to the casing, a cam, a support therefor movable with the second shaft, a roller pin on the first shaft and engaging the cam, and a testing tip secured to the second shaft at the exterior of the casing.

4. A friction tester comprising a casing, a casing supplementary to the first casing and having operative mechanism therein for rotating a shaft, a shaft in the first named casing rotated by said mechanism of the supplementary casing, a second shaft surrounding the first shaft and extending beyond the same and exterior to the casing, a cam, a support therefor movable with the second shaft, a roller pin on the first shaft and engaging the cam, and a testing tip secured to the second shaft at the exterior of the casing, a sleeve on the cam support, and movable therewith, said casing having a scale, and an opening in the side thereof, markings on the sleeve visible through the opening of the casing for reading the axial movement of the sleeve.

5. In a friction tester, an axially movable and rotatable member having a cam surface, a driver therefor, a sleeve surrounding the axially movable member movable therewith and having a line of demarcation thereon, a scale with which said line cooperates to indicate the coefficient of friction of the material being tested, a friction testing tip carried by the axially movable rotatable member, and a shaft for moving the driver and cam against the frictional resistance obtained by the material being tested to movement of the testing tip.

6. A friction tester including a rotatable shaft, means for rotating the shaft, a hollow shaft concentric with respect to the first shaft and mounted for relative axial and rotative movement with respect thereto, cooperative driving means between the two shafts including a cam of variable slope and a cam follower engaging the cam, a testing tip carried by the second shaft and rotatable therewith, an indicating sleeve carried by the second shaft, a casing surrounding the indicating sleeve and relatively movable axially with respect thereto, said first mentioned shaft being rotatably mounted in said casing, and means carried by the casing and cooperating with said indicating sleeve for visually indicating the extent of relative axial movements of the two shafts.

7. A friction tester comprising a casing having an opening in the side thereof, a movable friction element exterior to the casing adapted to contact with the surface of the work to be tested, driving means, means interposed between the driving means and the friction element for rotating said friction element while simultaneously moving said friction element axially an amount dependent on the frictional resistance of the work to the turning of the element, a sleeve within the casing connected to the friction element and adapted to move axially of the casing and to be visible through the opening in the casing to show the position of the sleeve in respect to the casing, a scale, and marking on the sleeve in conformity with the zero position of the sleeve in respect to the scale whereby upon the movement of the sleeve the position of the sleeve is indicated on the scale marking.

8. A friction tester comprising a casing having an elongated opening in the side thereof and scale markings including a zero line placed continguous to the opening of the casing, a rotatable friction element exterior to the casing, adapted to contact with the surface of the work to be tested, driving means, means interposed between the driving means and the friction element for rotating said friction element while simultaneously moving said friction element axially of the casing an amount dependent on the frictional resistance of the work to the turning of the member, a sleeve connected for movement with the friction element within the casing adapted to move axially of the casing and to be visible through the opening in the casing, and having a marking thereon of different colors separated by a line in registration with the zero marking on the scale, when said sleeve is in initial position, said opening in the casing being adapted to show the position of the sleeve in respect to the casing and said markings being adapted to indicate the degree of friction, movement of the sleeve in respect to the casing and the aforesaid markings indicating the relative movement of the friction element.

9. A friction tester comprising a casing having a sight opening in the side thereof, a work engaging member rotatably and slidably carried by the casing, driving means in the casing, coacting means carried by the driving means and the member to rotate the member while simultaneously moving the member axially of the casing an amount dependent on the frictional resistance of the work to the turning of the member, and an indicating means connected to the member and movable axially therewith and visible through said sight opening.

SYDNEY G. TILDEN.